Nov. 23, 1937.  W. H. BAHLKE ET AL  2,099,718
DECOMPOSING HYDROCARBON OILS
Filed April 29, 1931   5 Sheets-Sheet 1

Inventors:
William H. Bahlke,
Robert F. Ruthruff
Frederick W. Sullivan, Jr.
By Dyrenforth, Lee, Chritton & Wiles,
Attys.

Patented Nov. 23, 1937

2,099,718

UNITED STATES PATENT OFFICE 2,099,718

DECOMPOSING HYDROCARBON OILS

William H. Bahlke, Robert F. Ruthruff, and Frederick W. Sullivan, Jr., Hammond, Ind., assignors to Standard Oil Company, Whiting, Ind., a corporation of Indiana Application April 29, 1931, Serial No. 533,776

2 Claims. (Cl. 196—48)

The present invention relates to improvements in the decomposition of hydrocarbon oils, and more particularly to such processes wherein residual hydrocarbon oil products are decomposed to form a coke substantially free from liquid products, as set forth in the prior applications of Robert E. Wilson, Serial No. 329,419, filed December 31, 1928, which has matured as Patent No. 2,090,245, and Serial No. 505,857, filed December 31, 1930, which has matured as Patent No. 1,991,971.

The present invention will be fully understood from the following description, illustrated by the accompanying drawings, wherein.

Figure 1:
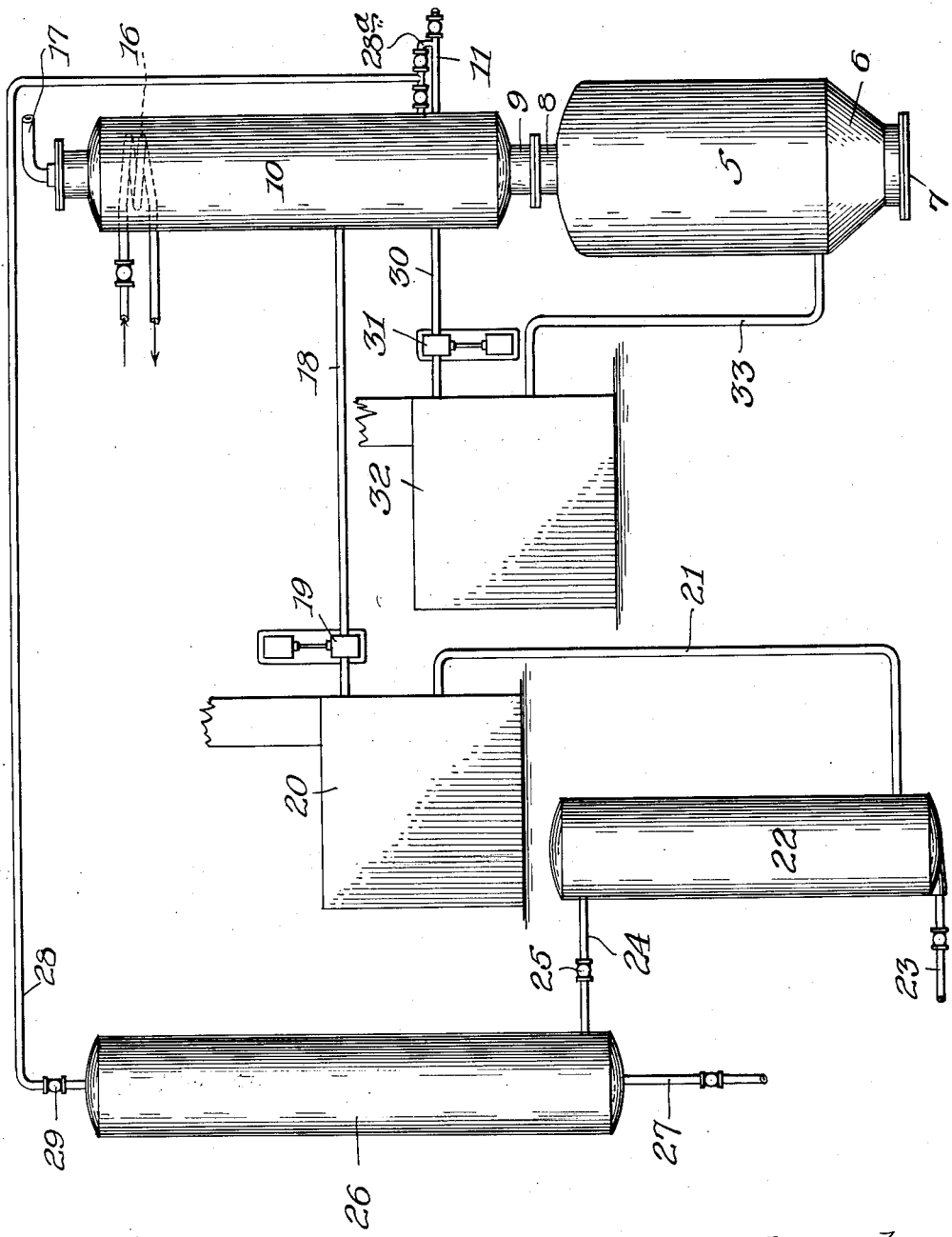
Figure 1 is a diagrammatic view, partly in section, showing apparatus suitable for carrying the invention into effect.
Figure 5:
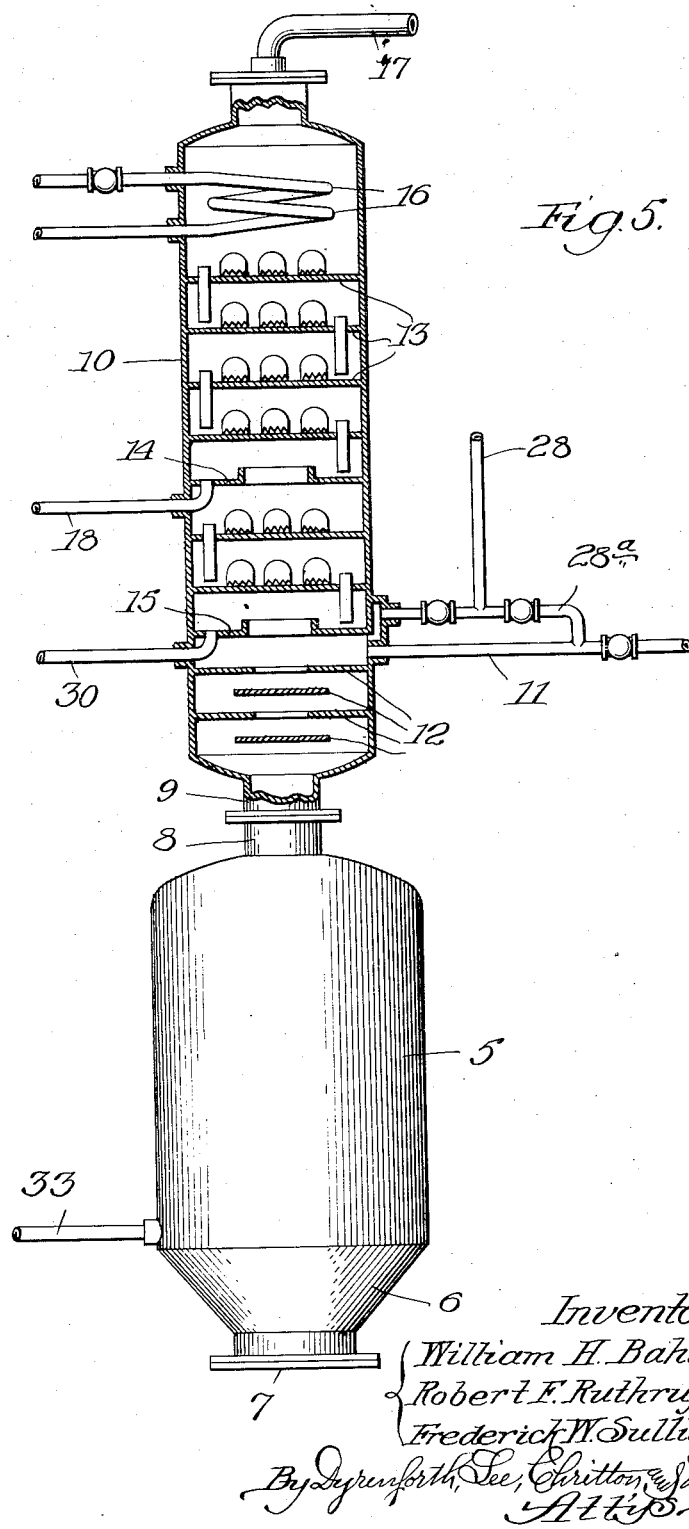
Fig. 5 is a diagrammatic sectional view illustrating a suitable type of construction for the decomposing chamber and tower of Fig. 1.

Referring more particularly to Figs. 1 and 5 of the drawings, the numeral 5 designates an enlarged chamber, suitably insulated to prevent loss of heat, and provided at its lower end with a large opening 6 for removal of coke and for cleaning purposes, this opening being closed by a suitable manhead 7. At its upper end the chamber 5 is provided with a vapor outlet 8, which is connected to the inlet 9 of a vertical tower or column 10, which is likewise insulated or lagged in any suitable manner to prevent loss of heat.

A valved inlet pipe 11, for the supply of a fresh oil containing residue constituents, such as crude oil, topped crude or the like, discharges into the tower 10 in the lower portion thereof. Below the point of discharge of the inlet pipe 11, the column 10 is provided with baffle plates 12 to promote heat interchange between the incoming oil and the vapors coming from the chamber 5. These baffle plates 12 are of any suitable type, such as doughnut and disk plates, to supply passages of large cross sectional area, so that the entering oil will be heated while in rapid movement and coking or closing of the passages by deposits of coke avoided.

Above the point of entry of the inlet pipe 11, the column 10 is provided with fractionating plates of any suitable type for effective heat interchange and fractionation, such as bubble plates 13. At suitable points in the column the trap-out plates 14 and 15 are provided, to collect and permit the removal of condensates of selected boiling points, as hereinafter more fully set forth. The desired condensation is secured in the column 10 by any suitable cooling means, such as the cooling coil 16 in the upper portion of the column. If desired, a part or all of the cooling in the column 10 may be effected by liquid introduced into the upper portion thereof, for example, all or any portion of the feed stock may be passed from line 11 by suitable connections (not shown). At its top, the column is provided with a vapor outlet 17 for low boiling products, leading to suitable condensers, receivers and gas separators of the usual types (not shown).

From the upper trap-out plate 14, a lower boiling reflux condensate, for example, one having an end boiling point not above about 700° F., is withdrawn through the line 18 by pump 19 and forced under suitable pressure through the heating coil in pipe still furnace 20, in which it is brought to a cracking temperature. The hot oil products, which are in general substantially completely vaporized, pass from the pipe still furnace 20 through the line 21 to the cracking chamber 22, which is suitably lagged to prevent loss of heat therein. Means may be provided for the removal of tars from the chamber 22, if desired, such as the outlet pipe 23. In the enlarged chamber 22, the hot oil products from the coil are maintained at cracking temperature to effect further conversion thereof, and the converted products pass out through the line 24 provided with a pressure reducing valve 25 to the column 26, which is also preferably lagged.

In the column 26, which may be at the same pressure as the cracking chamber 22, or may be at a lower pressure, controllable by valve 25, tarry matters and any heavy condensate that may be formed are removed from the cracked products and may be withdrawn through the valved discharge line 27. Baffle plates of any desired type (not shown) may be provided in the column 26 to aid in the separation of such entrained and condensed liquids, the vapors passing out of the tower 26 to the vapor line 28 provided with a valve 29. In the event that the tower 26 is operated at a higher pressure than that prevailing in the column 10, the valve 29 may serve as a pressure reducing valve.

The separated vapor products from the tower 26 are introduced by the line 28 into the column 10 in the lower portion thereof, preferably below the lower trap-out plate 15, to be fractionated therein with the vapors rising from the lower portion of the column. If desired, the vapor products from tower 26 may mix directly with the fresh oil in line 11 as it enters the column, thus further preheating the oil.

A heavier condensate product, collected in the trap-out plate 15 in the column 10, is withdrawn through the line 30 by pump 31 and forced through a pipe still furnace 32, in which it is heated to a high cracking temperature, suitably 900° F. or higher. From the pipe still furnace 32 the heated oil products, which may be largely vaporized, pass through the line 33 into the coking chamber 5, and maintain the latter at a decomposition temperature, the residue products therein being decomposed by the heat thus supplied into a coke substantially free from liquid products.

The vapor products of decomposition from the coking chamber 5 pass out of the latter through the vapor outlet 8 and pass into the lower portion of the column 10 through the vapor inlet 9. In upward passage through the column, the vapors contact with and heat the fresh oil containing unvaporizable constituents which are admitted to the column 10 through the pipe 11, vaporizing a portion of the latter and rapidly heating the unvaporized constituents to a high temperature. Some condensation of vapors rising from the coking chamber 5 takes place in this section of the column 10 and such condensate, together with the heated unvaporized constituents of the fresh oil and tars or heavy liquids separated from the cracked products from the tower 26 descend into the coking chamber 5 to be decomposed therein to coke. The combined vapors from the lower portion of the column 10 rise in the latter and are fractionated, and constituents heavier than the desired low-boiling products (in general, of the gasoline boiling point range) are condensed in the column 10. The desired low-boiling constituents and gases pass out through the vapor line 17 for condensation and separation of uncondensed gas.

The reflux condensate trapped out at the plate 14 is suitably an intermediate product having an end point of in general not more than 750° F. and preferably from 600 to 650° F. In passage through the pipe still furnace 20, it may suitably be brought to a temperature of 800° F. or higher, and preferably between 850 and 925° F., while maintaining thereon an outlet pressure of from 100 to 900 lbs. or higher, and preferably between 125 and 200 lbs. Under the preferred pressure and temperature conditions, the products are substantially completely vaporized and the vapors are to some extent converted into low-boiling products. This conversion is continued in the enlarged chamber 22, in which approximately the same pressure maintained as at the outlet of the pipe still 20. A cracking temperature is maintained in the chamber 22, in general from 50 to 75° lower than the outlet temperature of the coil. In case pressures are employed in the pipe still 20 which are higher than those in the above preferred range, a substantially lower pressure may be maintained in chamber 22 to cause any liquid products from still 20 to be flashed into vapors in the chamber 22. The vapors pass slowly through the chamber 22 and substantial further conversion takes place therein. There may be some formation of tars, which may be removed, for example, as described in the prior application of Harold R. Snow, Serial No. 428,431, filed February 14, 1930.

The converted vapors pass out of the chamber 22 through the line 24 and pressure reducing valve 25 into the chamber 26, there being some cooling of the vapors and separation of tars and heavier condensates therefrom, which are removed through the line 27. Vapors pass out of the chamber 26, preferably at a temperature of 700 to 750° F. or even higher, and enter the tower 10 as hereinbefore described. The chamber 26 may be maintained at the same pressure as the column 10, that is, substantially atmospheric or only slightly thereabove, or at some higher pressure below the pressure maintained in the cracking chamber 22, say at 60 to 200 lbs. pressure, and preferably from 60 to 100 lbs.

The reflux condensate collected in the plate 15 in the column 10 and withdrawn through the line 30 may suitably be a product having an end boiling point below 800° F. and preferably between 700 and 750° F. In passage through the pipe still furnace 32, the oil is heated to a high temperature, above 850° F. and preferably from 900 to 925° F., and is then discharged into the coking chamber 5, to maintain therein a suitable temperature for the desired decomposition, say from 810 to 875° F. The pressure in the coking chamber 5 may be atmospheric or slightly thereabove, say up to 50 lbs. gauge.

Figure 2:
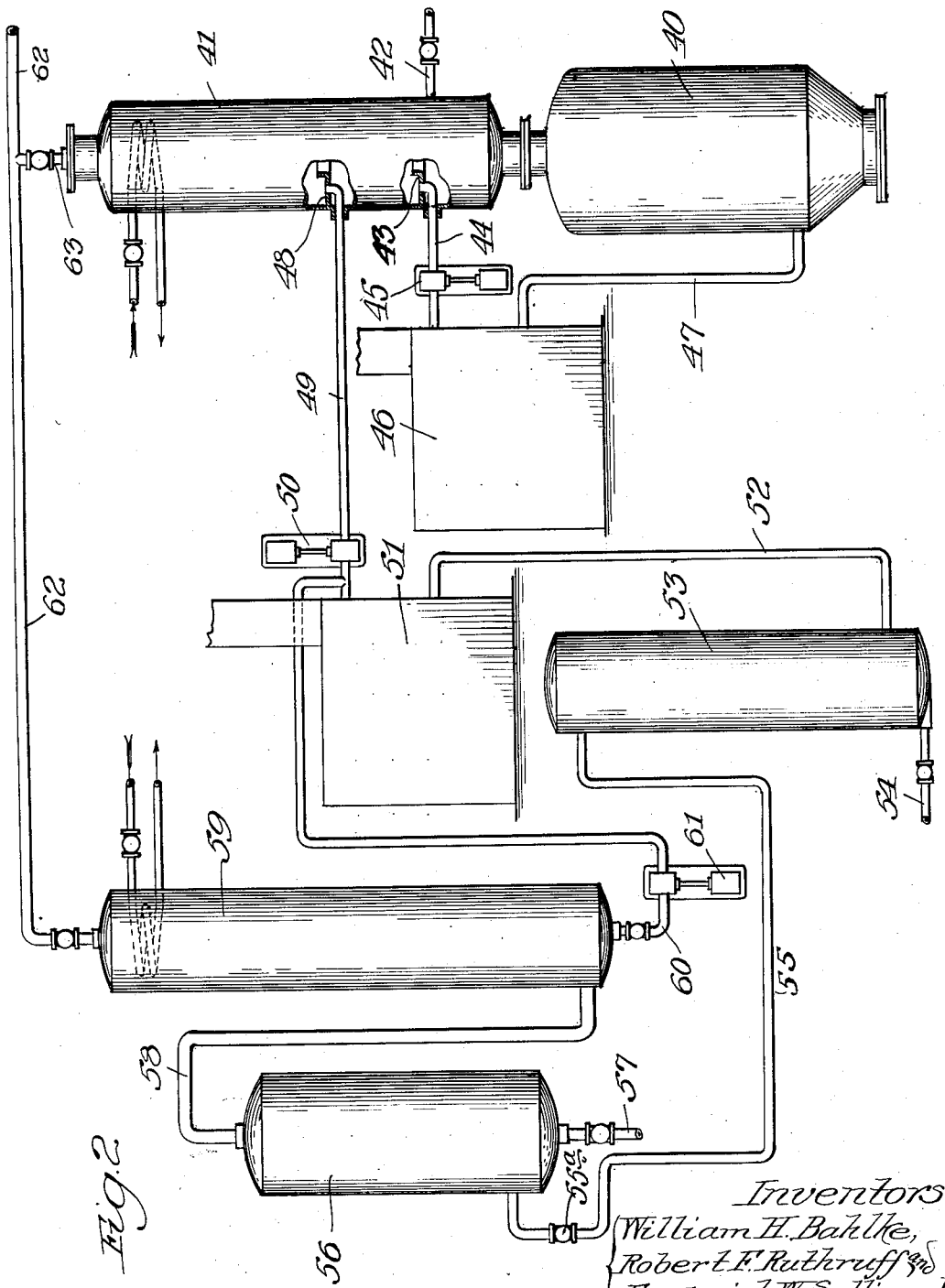
Fig. 2 is a similar diagrammatic view of apparatus suitable for carrying into effect a modified operation in accordance with the invention.

In Fig. 2 there is illustrated a layout of apparatus suitable for carrying into effect a modified operation in accordance with the invention. In Fig. 2, the numeral 40 designates a coking chamber similar to that designated by numeral 5, and connected in a like manner with the column 41, which is similar to the column 10 of Fig. 1. Fresh oil containing residue products is supplied to the column 41 through the line 42. From the lower trap-out plate 43 in the column 41, a higher boiling reflux condensate with an end point above 700° F. and suitably from 800 to 850° F., is withdrawn through the line 44 by pump 45 and forced through the pipe still furnace 46, being heated therein, and the heated oil products are discharged through the line 47 into the coking chamber, the conditions of heating of the oil being as described in connection with Fig. 1, such as to maintain the desired decomposing conditions in the coking chamber 40 and convert the residual products contained therein to coke substantially free from liquid constituents.

The lower boiling reflux condensate formed in the column 41 and collected in the trap-out plate 48, which condensate has in general an end point not above 750° F. and suitably between 650 and 700° F., is withdrawn through the line 49 by pump 50 and passed through the pipe still 51, in which it is substantially completely vaporized and the resulting products heated to a high cracking temperature, substantially as described in connection with Fig. 1. The resulting heated products pass through the line 52 to the cracking chamber 53 through which the hot vapors pass slowly while being maintained at cracking temperature, whereby substantial further conversion is effected. Any tars or liquids deposited in the cracking chamber 53 may be withdrawn through the valved discharge line 54. The vapors, after their travel through the cracking chamber 53, pass out through the vapor line 55 provided with a valve 55ª which may be employed, if desired, as a pressure reducing valve, and enters the separating chamber 56, in which heavy liquids and tars may be separated therefrom. These separated heavy liquids and tars may be withdrawn from the chamber 56 through the valved line 57. Vapors pass out of the separating chamber 56 through the vapor line 58 and enter the fractionating column 59, in which they are suitably fractionated to remove therefrom constituents heavier than the desired low boiling products (generally in the gasoline range of boiling points). These condensed constituents having a boiling point range above that of gasoline or the desired low boiling products may be drawn out of the column through the discharge line 60 by pump 61 and forced into the stream of oil from the column 41 entering the pipe still furnace 51.

The vapors and gases not condensed in the column 59, pass out through the vapor line 62, which likewise receives the uncondensed vapors from the column 41, which leaves the latter through the vapor line 63. The combined vapors pass to condensers and receivers of any suitable type (not shown).

Figure 3:
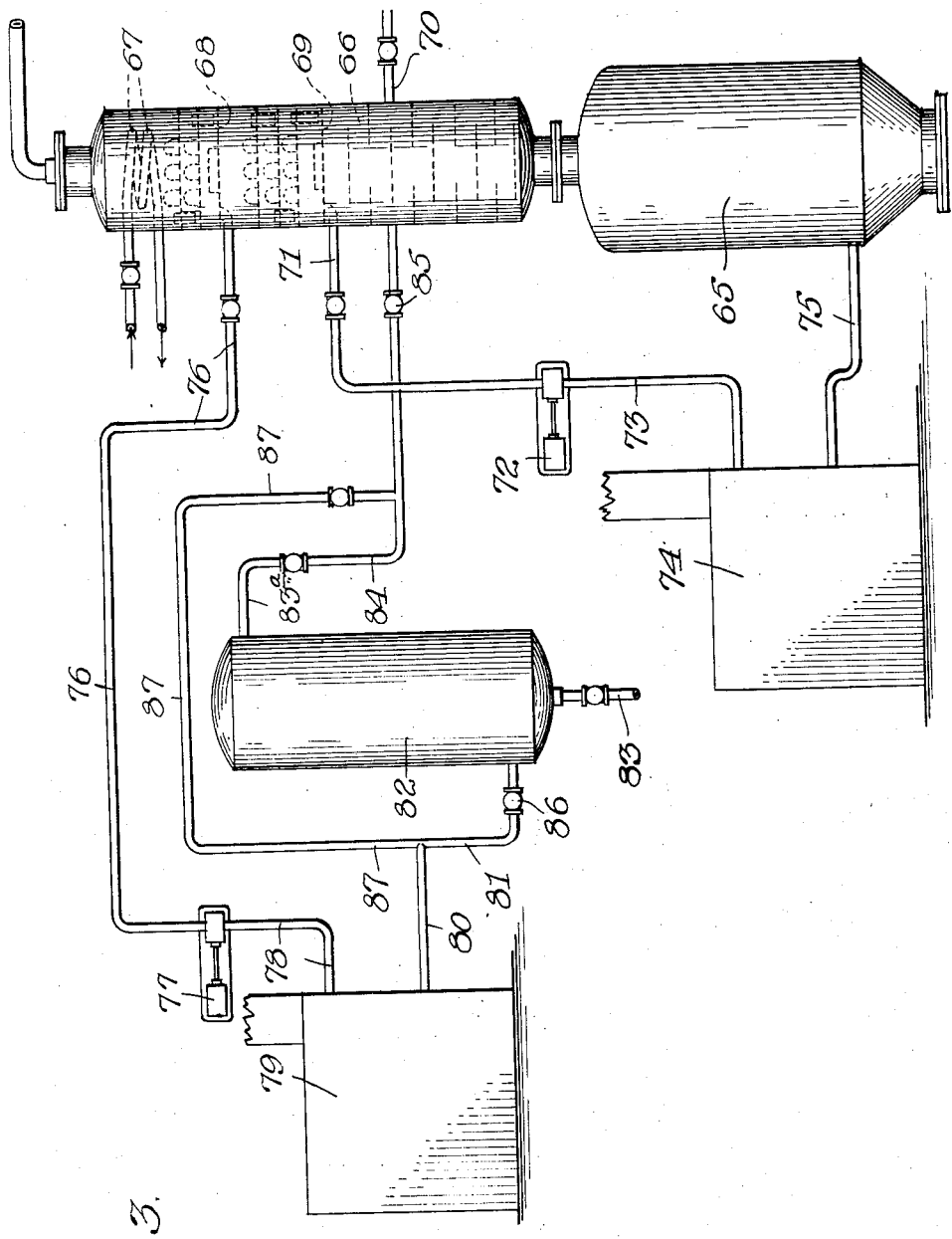
Figs. 3 and 4 are similar diagrammatic views of a simplified form of apparatus in which the invention may be practiced.

A somewhat simplified layout of apparatus suitable for carrying out the invention is illustrated in Fig. 3. In the form of apparatus shown in this figure, the decomposing or coking chamber 65 is similar in construction to that in figures above described. Vapors pass from it into the column 66, provided at its top with the cooling coil 67 and at intermediate points with trap-out plates 68 and 69 respectively. Below the lower trap-out plate 69, the fractionating or baffle plates in the column 66 are, as in the previously described modifications, of a type providing large vapor and liquid passages, such as doughnut and disk plates. The fresh oil for the system, which is preferably one containing residue constituents, is supplied to the tower 66 below the lower trap-out plate 69, for example, through the valve controlled line 70.

A heavier condensate from the vapors which ascend the column 66, for example, one having an end point not above 800 to 850° F. and preferably about 750° F. is withdrawn from the lower trap-out plate 69 of column 66 through the line 71 by pump 72 and forced through line 73 into and through the pipe still furnace 74, in which the oil is heated to a suitable high cracking temperature, preferably above 900° F. It is then discharged through line 75 into the decomposing or coking chamber 65, to maintain the desired conditions therein as described above in connection with previous modifications of apparatus.

A lighter condensate, for example, one having an end point not above 750° F. and suitably between 650 and 700° F. is withdrawn from the upper trap-out plate 68 of column 66 through line 76 by pump 77, and forced through line 78 into and through the pipe still 79, in which it is heated, preferably under pressure, to a cracking or conversion temperature. It is preferred that the conditions of pressure and temperature in the pipe still be such that the oil be vaporized therein and subjected to cracking conditions in vaporized form. Some cracking of the oil, say 5 to 15%, may take place in its passage through the pipe still 79. The heated oil is then discharged through the lines 80 and 81 into the lagged cracking chamber 82, in which a cracking temperature is maintained and further cracking effected while the products from the pipe still pass at reduced velocity therethrough. In the event that some liquid tar deposits in the enlarged cracking chamber 82, it may be withdrawn through the line 83. The vapor products of conversion pass out from the enlarged chamber 82 through the line 83ª and enter the line 84 which discharges into the tower or column 66 at a suitable point, preferably below the lower trap-out plate 66. A pressure release valve 85 is provided in the line 84 and by it any desired conditions of pressure may be maintained in the enlarged chamber 82. Ordinarily, the enlarged chamber 82 will be substantially at the outlet pressure of the pipe still 79, but in the event that a pressure differential is desired between the pipe still and the enlarged chamber 82, it may be secured by means of the valve 86 in the line 81.

If desired, the products from the pipe still 79, instead of passing through the enlarged chamber 82, may be passed directly from the outlet line 80 through the valved line 87 into the line 84 leading into the column 66, the pressure at the outlet of the pipe still being then controlled by means of the valve 85.

In general, the condition of heating of the heavier condensate withdrawn from the column 66 and discharged into the decomposing chamber 65 to secure the desired conditions therein and those of the heating of the lighter condensate will be substantially similar to those described in previous modifications of Figs. 1 and 2. In the operation of the form of construction of Fig. 3, the products of heating or conversion of the lighter condensate, received either from the enlarged cracking chamber 82 or directly from the pipe still 79 into the column 66 directly and in general with a substantial reduction in pressure, and heavy liquids or tarry matter may separate from the said products of conversion in the lower portion of the column 66 and be admixed with other heavy unvaporized liquids descending into the decomposing chamber 65. The vapor products of conversion of the lighter condensate are commingled with the vapors from the fresh feed and from the decomposing or coking chamber 65, and rise through the column for treatment in the same manner as in the modifications of Figs. 1 and 2. The lower portion of the column 66 may, in this modification as well as in those previously described, be maintained at such a temperature that cracking of the products contained therein occurs to a greater or less extent.

Figure 4:
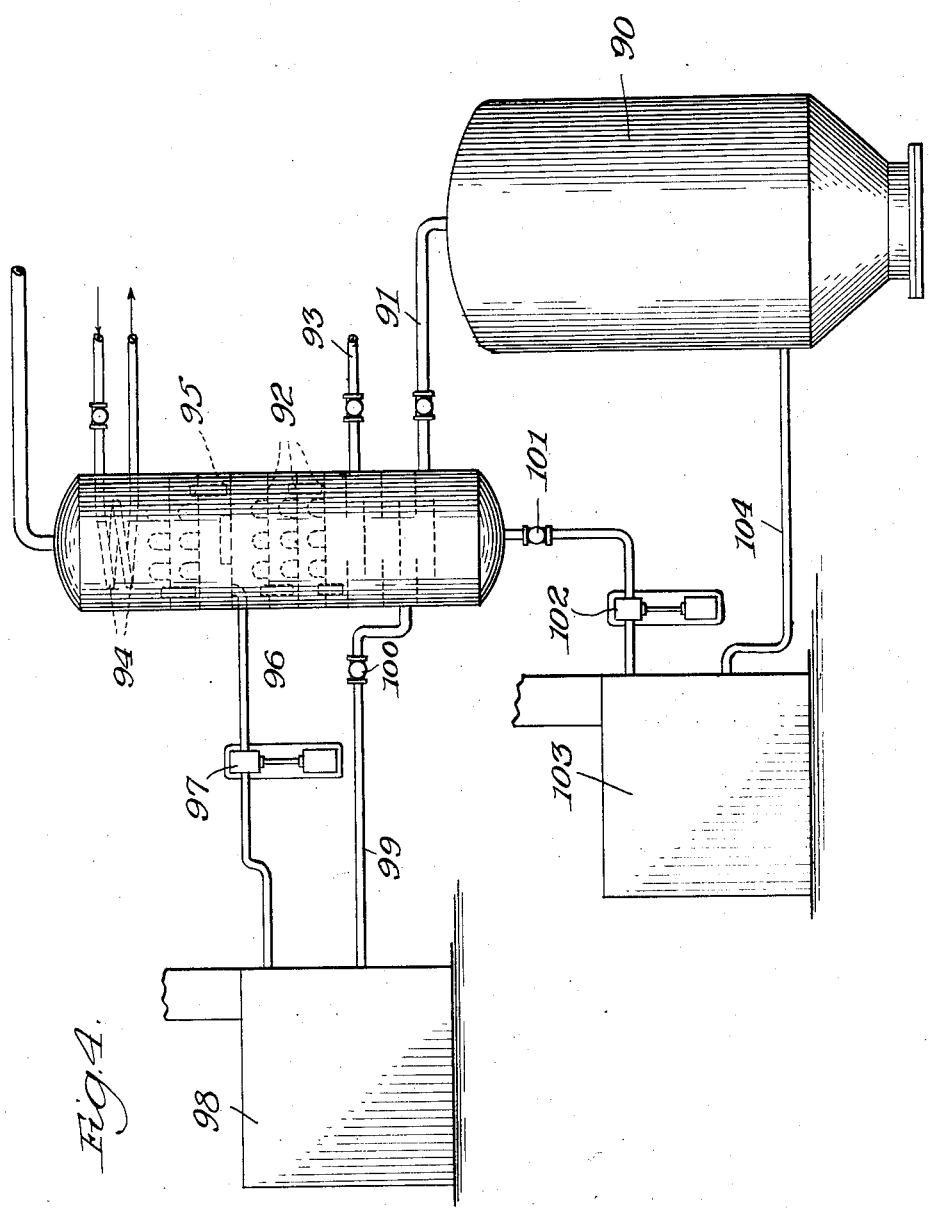

The conditions of treatment of the lighter distillate in passing through the pipe still 79 and the cracking chamber 82, or through the pipe still alone when the cracking chamber is not employed, may be widely varied. Higher pressures, say up to 500 or even to 900 lbs. may be used with lower temperatures of, say, 800 to 850°, to ensure the maintenance of substantial quantities of unvaporized liquid in the cracking coil and enlarged chamber, or such temperature and pressure ranges may be employed, as hereinbefore described, to secure substantial vaporization of the distillate and conversion in the vapor form. Likewise, if desired, the distillate oil may be passed through the cracking coil 79 and brought to a suitable cracking temperature, with an outlet pressure substantially equivalent to that prevailing in the tower 66, that is, atmospheric or slightly above, up to 50 lbs. gauge. A further modified layout of apparatus suitable for carrying the invention into effect is illustrated in Fig. 4. In the apparatus of this figure, the numeral 90 designates the lagged decomposing chamber, from which vapors pass through the vapor line 91 to the lower portion of the column 92. The fresh oil, preferably one containing residual constituents, is introduced into the column 92 through the valved line 93 at an intermediate point near the bottom of a column, the plate in the lower portion of the column below the point of introduction of the fresh oil being of the type providing large, free passages for liquids and vapors, as described in connection with the preceding modifications, for example, doughnut and disk types.

A cooling coil 94 is provided in the upper portion of the column 92 and at an intermediate point in the column, the trap-out plate 95, for collection and removal of reflux condensate is provided. The reflux condensate thus collected on the plate 95 may be removed through the line 96 by pump 97 and forced through the pipe still 98 in which it is heated to a suitable cracking temperature, under any desired pressure at the outlet of the coil not lower than that prevailing in the tower 92. In general a substantially higher pressure will be maintained at the outlet of the pipe still 98, the temperature and pressure maintained at the outlet of the pipe still varying, as described in connection with the modification in Fig. 3, in accordance with the conditions of cracking which it is desired to attain.

The heated oil products leave the pipe still 98 through the line 99 provided with the valve 100, which may be employed to control pressure at the outlet of the coil. The products enter the lower portion of the column 96, further heating the fresh oil supplied therein, and vaporized portions ascend the column 92 with the vapors from the decomposing chamber 90 and the vapors driven off from the fresh oil introduced through the line 93.

The commingled unvaporized constituents which collect in the bottom of the column 92, these including reflux condensate formed in the lower portion of the column, are withdrawn through the discharge line 101 by pump 102 and forced through the pipe still 103, in which they are brought to a high decomposing temperature, generally in excess of 800° and preferably above 900° F. The products are then discharged through the line 104 into the decomposing chamber 90, which is maintained at atmospheric pressure or slightly thereabove, say at a pressure not exceeding about 50 lbs. gauge. With temperatures of 810 to 820° F. and higher, preferably 910 to 920° F., unvaporized products retained in the decomposing chamber 90 are converted into a coke substantially free from liquid constituents. The conditions maintained in the operation of the pipe still 103 and the decomposing chamber 90 are preferably substantially those described in the prior application of Robert E. Wilson, Serial No. 329,419, supra.

Although in the description of the various modifications of the invention given above, conditions have been set forth such that decomposition to coke substantially free from liquid products is secured in the decomposing chambers of the various modifications, it is obvious that many features of the present invention may be employed in connection with operations in which liquid tar is secured in and removed from the decomposing chamber. In general, however, the preferred conditions of operation are such as to secure a substantially liquid-free residuum in the decomposing chamber and to secure vapor phase cracking conditions in the treatment of the distillate product withdrawn from the fractionating tower and returned to the lower portion thereof for contact and heat interchange with the fresh oil introduced into the tower and the vapors rising from the decomposing chamber.

We claim:

1. The method of decomposing hydrocarbon oils to form low boiling products therefrom which comprises maintaining residual oil products in a decomposing zone at a temperature to effect decomposition thereof into coke substantially free from liquid products, removing vapors therefrom and contacting said vapors in a dephlegmating zone with fresh oil containing residual products, thereby vaporizing a portion of said fresh oil and heating the unvaporized residual constituents thereof, combining the vaporized portion with said vapors outside of said decomposing zone, discharging said unvaporized residual constituents into said decomposing zone to be coked therein, subjecting the combined vapors from said zone and from the fresh oil to fractionation in a fractionation zone to form therefrom a plurality of condensate fractions of intermediate boiling point range free from said unvaporized residual constituents, leaving a low boiling point fraction uncondensed, heating a lighter condensate thus separated to vaporizing and cracking temperature under pressure to effect conversion thereof, directing the resultant products of conversion into a separating zone, separate and apart from said decomposing, dephlegmating and fractionating zones, in which separating zone said products of conversion are separated into vapors and residue, commingling the separated vapors with the combined vapors removed from the decomposing zone and from the fresh oil, to be subjected to fractionation, heating a heavier one of said condensates to cracking temperature and discharging it into the decomposing zone to maintain the desired decomposing conditions therein.

2. A method in accordance with claim 1 wherein the separated vapors from said separating zone are contacted with said fresh oil containing residual products prior to the introduction of said fresh oil into said dephlegmating zone.

WILLIAM H. BAHLKE.
ROBERT F. RUTHRUFF.
FREDERICK W. SULLIVAN, Jr.